(12) United States Patent
Tian et al.

(10) Patent No.: US 8,576,446 B2
(45) Date of Patent: Nov. 5, 2013

(54) DEBLURRING AND SUPERVISED ADAPTIVE THRESHOLDING FOR PRINT-AND-SCAN DOCUMENT IMAGE EVALUATION

(75) Inventors: Yibin Tian, Menlo Park, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 888 days.

(21) Appl. No.: 12/633,295

(22) Filed: Dec. 8, 2009

(65) Prior Publication Data

US 2011/0043864 A1     Feb. 24, 2011

Related U.S. Application Data

(60) Provisional application No. 61/236,076, filed on Aug. 21, 2009.

(51) Int. Cl.
*H04N 1/405*     (2006.01)

(52) U.S. Cl.
USPC ............................ 358/2.99; 358/3.22

(58) Field of Classification Search
USPC ............. 358/1.9, 2.99, 3.01, 2.1, 3.03, 3.2, 358/3.21–3.24, 3.13–3.14, 3.06, 3.16–3.18, 358/461, 465–466
See application file for complete search history.

(56) References Cited

U.S. PATENT DOCUMENTS 4,586,089 A * 4/1986 Nakazato et al. ............ 358/461
5,204,760 A * 4/1993 Murayama et al. .......... 358/3.03
5,335,089 A * 8/1994 Xie et al. ..................... 358/3.03
5,745,249 A * 4/1998 Crean et al. .................. 358/3.06
2003/0118233 A1    6/2003 Olsson

OTHER PUBLICATIONS

Sezgin et al., "Survey over image thresholding techniques and quantitative performance evaluation", Journal of Electronic Imaging, Jan. 2004, 13(1), pp. 146-165.
Kittler et al., "Minimum Error Threholding", Pattern Recognition, 1986, vol. 19, No. 1, pp. 41-47.
Otsu, "A Threshold Selection Method from Gray-Level Histograms", Jan. 1979, IEEE Transactions on Systems, Man, and Cybernetics, vol. 9, No. 1, pp. 62-66.
Baird, "The State of the Art of Document Image Degradation Modeling", 2007, Digital Document Processing: Major Directions and Recent Advances, pp. 261-279, Chaudhuri BB (Ed), Springer, NY.

(Continued)

*Primary Examiner* — Thomas D Lee
*Assistant Examiner* — Stephen M Brinich
(74) *Attorney, Agent, or Firm* — Chen Yoshimura LLP

(57) ABSTRACT

A method is described to obtain a binary image from the print-and-scan process to best match the known original. A point-spread function (PSF) of the PAS process is first obtained from its knife-edge responses, and deblurring is carried out on the scanned images using deconvolution. After image deskewing and preliminary registration, a supervised adaptive thresholding procedure is utilized to binarize the scanned image such that a measure of difference (e.g. the Euclidean distance) between the original and binarized images is minimized. The supervised adaptive thresholding procedure divides the scanned images into many rectangular sub-images. Otsu's method is used to find a starting threshold for each scanned sub-image. An optimal threshold is found around the Otsu's threshold via iterative search to minimize the measure of difference between the original sub-image and scanned sub-image. The sub-images are binarized using the optimal threshold. This method may be used in document authentication.

14 Claims, 4 Drawing Sheets

(56) References Cited

OTHER PUBLICATIONS

Smith, "PSF Estimation by Gradient Descent Fit to the ESF", Jan. 17, 2006, Proc. of SPIE. 6059: 69590E.

Richardson, "Bayesian-Based Iterative Method of Image Restoration", Jan. 1972, Journal of the Optical Society of America, vol. 62, No. 1, pp. 55-59.

Lucy, "An iteractive technique for the rectification of observed distributions", Jun. 1974, The Astronomical Journal, vol. 79, No. 6, pp. 745-754.

Zhang, "A Survey on Evaluation Methods for Image Segmentation", 1996, Pattern Recognition, vol. 29, No. 8, pp. 1335-1346.

Aradhya, "Skew Detection Technique for Binary Document Images based on Hough Transform", Jul. 1, 2008, International Journal of Information and Communication Engineering, pp. 493- 499, XP055050947, https://waset.org/jounals/ijice/v3/v3-7-67.pdf.

European Search Report in counterpart application EP 10173499.4 dated Feb. 1, 2013.

* cited by examiner

DEBLURRING AND SUPERVISED ADAPTIVE THRESHOLDING FOR PRINT-AND-SCAN DOCUMENT IMAGE EVALUATION

This application claims priority under 35 USC §119(e) from U.S. Provisional Patent Application No. 61/236,076, filed 21 Aug. 2009, which is herein incorporated by reference in its entirety.

BACKGROUND OF THE INVENTION

1. Field of the Invention

This invention relates to image processing, and in particular, it relates to deblurring and binarizing of a scanned grayscale image.

2. Description of Related Art

A print-and-scan process refers to a process in which an original digital image is printed on a recording medium (e.g. paper), and then scanned back to obtain a scanned digital image. During a print-an-scan process, some deformations, such as blurring and non-uniform intensity, are inevitably introduced.

In some document processing applications, such as printing and scanning (PAS) quality evaluation, document authentication, etc., it is desirable to obtain a document image after PAS that is as close to the original image as possible. In the simple scenario where the original image is binary and the scanned image is in grayscale, the problem becomes how to binarize the scanned image to obtain the best match of the original image. There are numerous thresholding methods in the literature. See, for example, Sezgin M, Sankur B, Survey over image thresholding techniques and quantitative performance evaluation, J Electron Imag. 13: 146-165 (2004) (hereinafter "Sezgin et al."). However, none of them utilizes the known original image in obtaining a binary image from the PAS process as its best match. Conventional thresholding algorithms such as Kittler's and Otsu's methods often fail to provide desired results.

According to Sezgin et al., Kittler and Illingworth's minimum error thresholding method (referred to as Kittler's method in this disclosure) was ranked the best binary thresholding algorithm for their non-destructive testing image set and document image set. Kittler's method assumes that the object (foreground) and background intensities follow Gaussian distributions and iteratively searches for a threshold that gives minimum classification error. See Kittler J, Illingworth J, Minimum error thresholding. Pattern Recogn. 19:41-47 (1985) (hereinafter "Kittler et al."). However, the Gaussian assumption may not be valid in some scanned grayscale document images. For example, a scanned grayscale document image may contain illumination noise introduced in the scanning process. When a scanned grayscale document image is substantially free of non-uniform illumination noise, Kittler's method can provide decent results in the binarized image. However, when significant non-uniform illumination noise is present, Kittler's method often fails to accomplish meaningful thresholding, resulting in the illumination noise spot being converted into a large dark (black) spot which obscures the document content.

Otsu's method is essentially a mean-square clustering technique. It minimizes (maximizes) the weighted sum of within-class (between-class) variances of the object and background pixels to find an optimal threshold. See Otsu N, A threshold selection method from gray level histograms, IEEE Trans Syst Man Cybern. 9: 62-66 (1979) ("Otsu"). Otsu's method ranked much lower than Kittler's method in the aforementioned performance comparison in Sezgin et al., but its performance is often satisfactory for images with and without significant non-uniform illumination noise.

Due to localized distortions of document images during PAS in addition to global degradations (see Baird H S, The state of the art document image degradation modeling, in Digital Document Processing: Major Directions and Recent Advances, Chaudhuri B B (Ed), Springer, NY. 261-279 (2007)), for example, distortions caused by non-uniform illuminations or shadows during scanning, it has been suggested that locally adaptive thresholding methods are better suited for PAS document images.

Using the locally adaptive Otsu's method, one can obtain perceptually satisfactory thresholding result from an 8-bit grayscale document image after PAS. However, compared to the original image, the binarized document image from PAS tends to have fatter (thicker) objects, indicating that the adaptive Otsu's method gives threshold value greater than the ideal threshold if the ultimate goal is to match the binarized document image to the corresponding original image. With different PAS apparatuses and settings, the opposite may happen as well, that is, the Otsu's algorithm may result in thinner objects than those in the original image.

SUMMARY

Accordingly, the present invention is directed to a method for deblurring and binarizing a scanned grayscale image that substantially obviates one or more of the problems due to limitations and disadvantages of the related art.

An object of the present invention is to provide a deblurring and binarizing process that minimizes differences between the original document image and the binarized image.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing system for processing a hardcopy document, the hardcopy document having been printed by a printer based on a digital original image, the original image being a binary image, the method including: (a) generating a grayscale scanned image from the hardcopy using an imaging device; (b) obtaining the original image; (c) dividing the original image into a plurality of original sub-images; (d) for each original sub-image, (d1) using template matching to find a scanned sub-image in the scanned image corresponding to the original sub-image; (d2) obtaining an initial threshold for binarizing the scanned sub-image; and (d3) obtaining an optimal threshold for binarizing the scanned sub-image using the initial threshold and an iterative search, wherein the optimal threshold generates an optimum binarized scanned sub-image that minimizes a measure of difference between the original sub-image and the binarized scanned sub-image; and (e) generating a binarized scanned image by combining the optimum binarized scanned sub-images generated in step (d).

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide an effective and practical approach to generate a scanned binary image from a print-and-scan (PAS) process that closely matches the known original digital image (a binary image). According to embodiments of the present invention, a scanned document image (grayscale or colored) is deblurred using a point-spread function (PSF) derived from print-and-scan knife-edge responses. After image deskewing and preliminary registration, a supervised adaptive thresholding procedure is utilized to binarize the scanned image such that a measure of difference between the original and binarized images (e.g. the Euclidean distance) is minimized.

The supervised adaptive thresholding procedure applies a classical thresholding method proposed by Otsu (see Otsu) in a modified adaptive approach, combined with supervision using the original image and correction of asymmetric blurring during PAS. Since Otsu's method is simple and fast, it is feasible to apply it in a locally adaptive fashion.

In addition, blurring caused by PAS is usually anisotropic. That is, the blurring in the horizontal and vertical directions differs depending on the printing and scanning direction due to the underlying physical processes. See Smith E H B, PSF estimation by gradient descent fit to the ESF, Proc. of SPIE. 6059: 60590E (2006) (hereinafter "Smith"). Such asymmetric distortions should be corrected in order to best match the binarized document image to the original image. Deblurring can be carried out to remove impact of such anisotropic blur if the blurring effects of PAS are characterized by a single point-spread function (PSF).

Figures 1, 2:
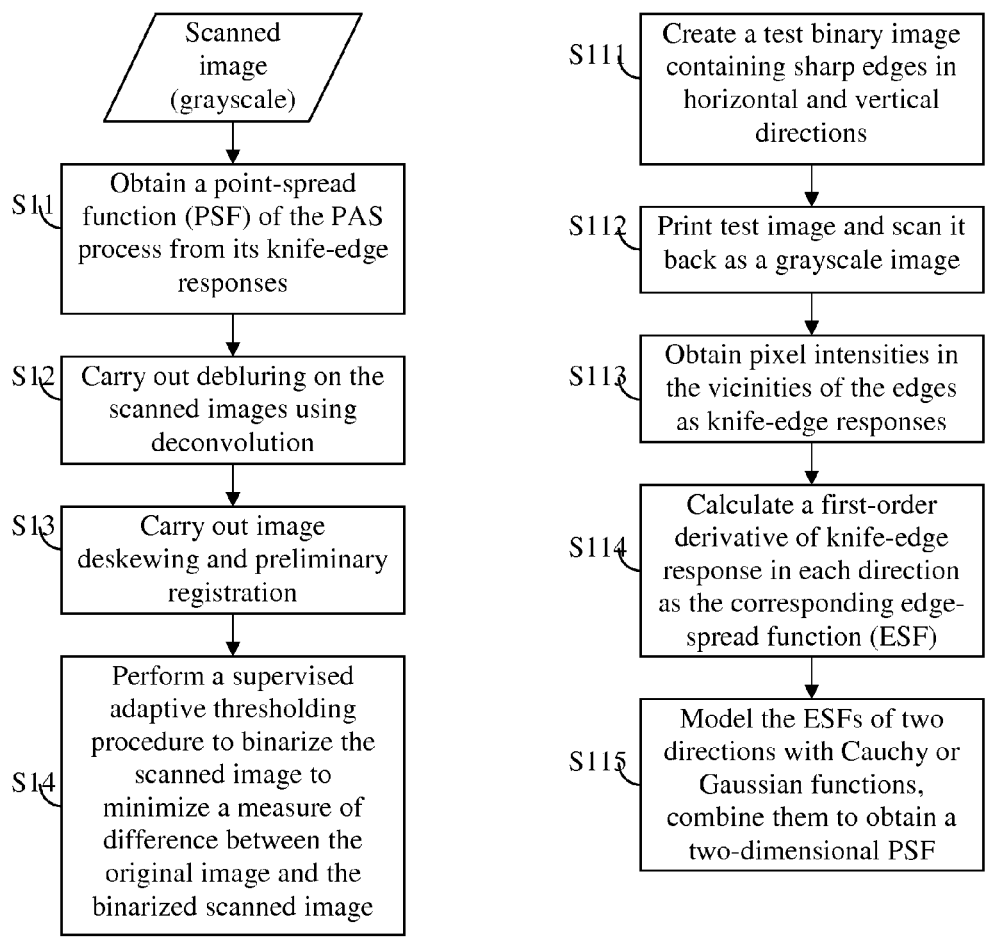
FIG. 1 is a flow chart illustrating a method for deblurring and binarizing a scanned image according to an embodiment of the present invention.
FIG. 2 is a flow chart illustrating a process of obtaining a point-spread function in the method of FIG. 1.

FIG. 1 illustrates the general flow of a process for generating a binary image from a scanned grayscale image according to an embodiment of the present invention. A point-spread function (PSF) of the PAS process from its knife-edge responses is obtained first (step S11). Deblurring is then carried out on the scanned images by a deconvolution procedure using the PSF (step S12). After carrying out image deskewing and preliminary registration (step S13), a supervised adaptive thresholding procedure is utilized to binarize the scanned image such that a measure of difference between the original and binarized images is minimized (step S14). The measure of difference between the original and binarized images may be, for example, the Euclidean distance between the two images. Here, the original image refers to the digital image (a binary image) used to generate the printed document which is then scanned back to obtain the scanned image. Details of the method are further explained below with reference to FIGS. 2-4.

Printing and scanning are complex processes that cause significant document image degradations, such as defocusing, skew, non-uniform illumination, irregular pixel placement and electronic noise etc. Blurring in PAS may come from defocusing, paper and sensor motion and other processes. It is generally nonlinear in nature. For simplicity, in embodiments of the present invention, the PAS process is treated as a linear system and a PSF is used to describe its degradation effects. The linear system can be viewed as the first-order approximation, and account for a significant portion of the real degradation in the PAS process.

As illustrated in FIG. 2, to obtain the PSF (step S11 in FIG. 1), a test image (a binary digital image) is created that contains sharp edges (knife-edges) in two non-parallel directions (e.g. horizontal and vertical directions) (step S111). The test image is printed and the printed image is scanned back as a grayscale scanned test image (step S112). The scanned test image is analyzed, and pixel intensities in the vicinities of the edges are obtained as the knife-edge responses of the PAS process (step S113). The first-order derivative of the knife-edge response in each direction is calculated as the corresponding edge-spread function (ESF) (step S114). The ESFs from the two perpendicular directions may be modeled with Cauchy or Gaussian functions, and combined to obtain a two-dimensional PSF (step S115). In step S112, the printer and scanner used to print and scan the test image are preferably the same (or the same model of) printer and scanner as those used to obtain the scanned image in FIG. 1. The PSF derived by this process is characteristic of the PAS, i.e., it is determined by the printer's and the scanner's properties.

Some of the steps in FIG. 2 have been used in the past to derive a PSF for purposes of evaluating the quality of scanners (see Smith).

Once the two-dimensional PSF is obtained for a PAS process, it can be used to deblur all images from this PAS process. In other words, although it is shown in FIG. 1 as a part of the entire process, it may be performed once (or from time to time if the stability of the printer and/or scanner is a concern), and the PSF is stored in memory. When processing an image, the PSF is retrieved from memory.

As shown in FIG. 1, an image from this PAS process may be deblurred by applying a deconvolution algorithm using the PSF (step S12). For deblurring, a Lucy-Richardson iterative algorithm may be used, as described in Richardson W H, Bayesian-based iterative method of image restoration, J Opt Soc Am. 62:55-59 (1972), and Lucy L B, An iterative technique for the rectification of observed distributions, Astron J. 79:745-754 (1974). The number of iterations is capped appropriately to reduce noise in the recovered image.

As the deblurred image will later be converted into binary image, and deblurring mostly affects pixels near edges, the deblurring process essentially erodes away a small fraction of pixels on edges in the resulting binarized image. Thus, as an alternative to deconvolution, morphological operations with properly chosen asymmetric kernels may be applied to the binarized image to achieve the effect of deblurring. In other words, in this alternative method, the deblurring step S12 is omitted, and a step of morphological operations is performed after step S14 in FIG. 1.

Figure 3:
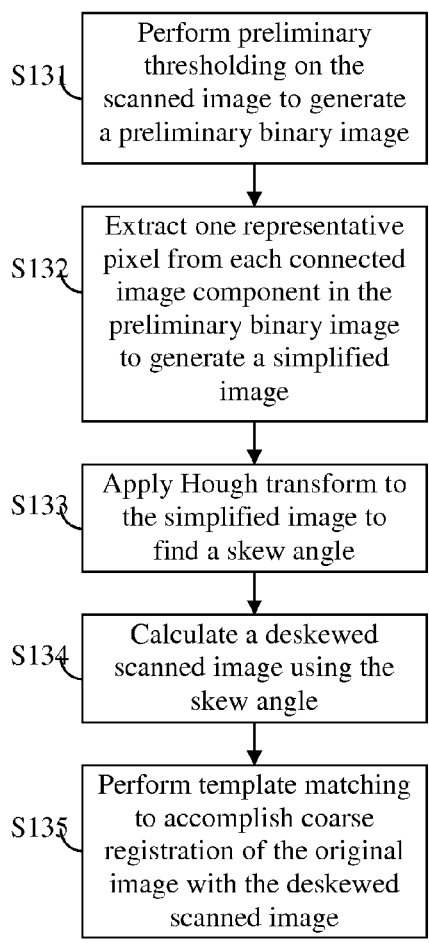
FIG. 3 is a flow chart illustrating an image deskewing and preliminary registration process in the method of FIG. 1.

Rotation and translation are often introduced during PAS. To facilitate image comparison in PAS evaluation, the scanned image should be aligned with the original digital image properly (e.g. by step S13 of FIG. 1). Any suitable deskewing methods may be used to implement this step. For example, deskewing methods based on Hough transform are widely used in document image processing. However, for high-resolution document images, Hough transform is computation-intensive. A preferred implementation of image deskewing and registration (step S13) for the present invention is illustrated in FIG. 3.

To perform image deskewing and registration, preliminary thresholding is carried out on the scanned image first (step S131), which may be accomplished by applying Otsu's method to the entire scanned image. The preliminary binary image is used to perform deskewing and registration of the scanned image as follows. First, one representative pixel is extracted from each connected image component in the preliminary binary image (step S132). Preferably, the representative pixel is the centroid of the image component. Alternatively, the top or bottom (for horizontal layout) or left or right (for vertical layout) extreme pixel of each image component may be used as the representative pixel. Then, a Hough transform is applied to this simplified image (i.e. an image comprising only the representative pixels of each image component) to find a skew angle (step S133). A Hough transform essentially fits lines to the dots in the simplified image, and the skew angle is defined between the fitted lines and the horizontal (assumed as 0 degree) or vertical (assumed as 90 degree) directions. A deskewing calculation (i.e. rotation) is then performed on the scanned image (grayscale) using the skew angle to generate a deskewed scanned image (grayscale) (step S134). Template matching is then carried out to accomplish coarse registration of the original image (binary) with the deskewed scanned image (grayscale) (step S135).

Figure 4:
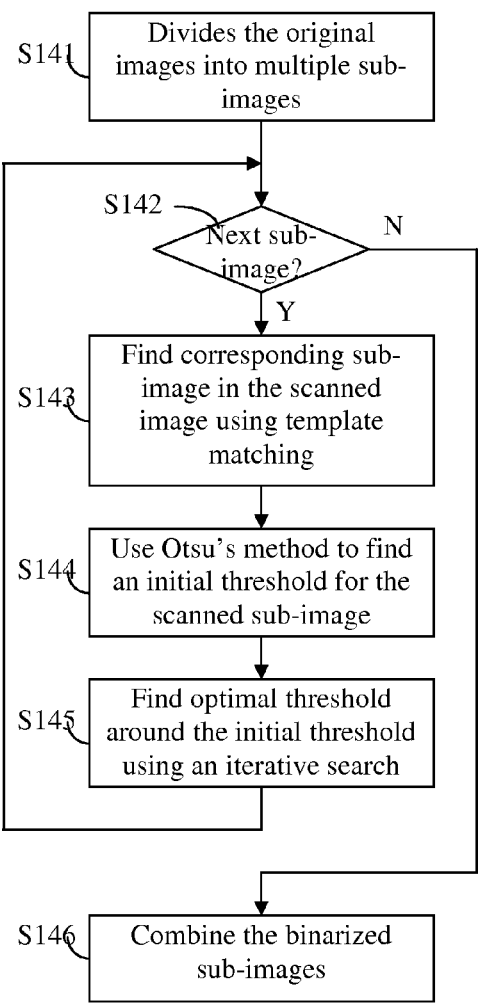
FIG. 4 is a flow chart illustrating a supervised adaptive thresholding procedure process in the method of FIG. 1.

The supervised adaptive thresholding procedure (step S14 of FIG. 1) is illustrated in FIG. 4. First, the original image is divided into multiple sub-images, referred to as original sub-images (step S141). Preferably, the original sub-images are rectangular in shape and have a size of, for example, 64 by 64 or 128 by 128 pixels. For each original sub-image (step S142), a template matching process is carried out to find its corresponding sub-image in the scanned image, referred to as scanned sub-images (step S143). Otsu's method is applied to the scanned sub-image to find an initial threshold (step S144). Then, the optimal threshold for the scanned sub-image is found around the initial threshold using an iterative search (step S145). The search may be an exhaustive or binary search in a neighborhood around the initial threshold. The optimal threshold is one that, when used to binarize the scanned sub-image, minimizes the difference between the original sub-image and the binarized scanned sub-image. In one implementation, the Euclidean distance is used as a measure of the difference. In another implementation, the classification error is used as a measure of the difference. Classification error of an image is the ratio between the number of wrongly classified pixels and the total number of pixels in the image (see Sezgin et al.; see also Zhange Y J, A survey on evaluation methods for image segmentation, Pattern Recogn. 29: 1335-1346 (1996)). As a result of step S145, an optimum binarized scanned sub-image is obtained. After all sub-images are processed ("N" in step S142), the optimum binarized scanned sub-images are combined to generate the binarized scanned image (step S146). Desirable post-processing may be optionally carried out.

The inventors of the present invention implemented an embodiment of the invention described above using Matlab Image Processing Toolbox and a few computation-intensive routines (such as template matching) in C++ to utilize OpenCV library for its superior performance. These tools are familiar to those skilled in the art. Test samples (original images) were created by scanning magazine and legal contract document using a Konica Minolta Bizhub C353 multi-function peripheral (MFP). The original images had a resolution of 400 dpi (4400×3400 pixels for letter size of 11×800201/2 inches) in binary format, and the scanned-back images had a resolution of 600 dpi (6600×5100 pixels for letter size) in 8-bit grayscale. Scanned images were resized to match the original images for the image registration and supervised thresholding.

Figure 5:
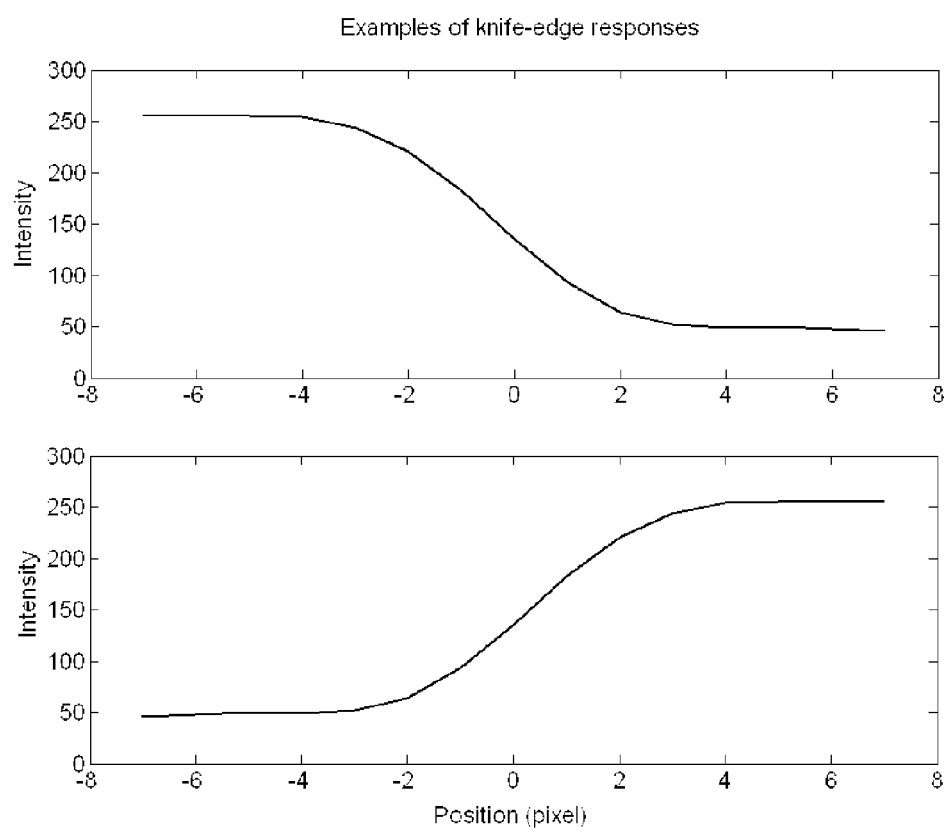
FIG. 5 illustrates exemplary knife-edge response functions.
Figure 6:
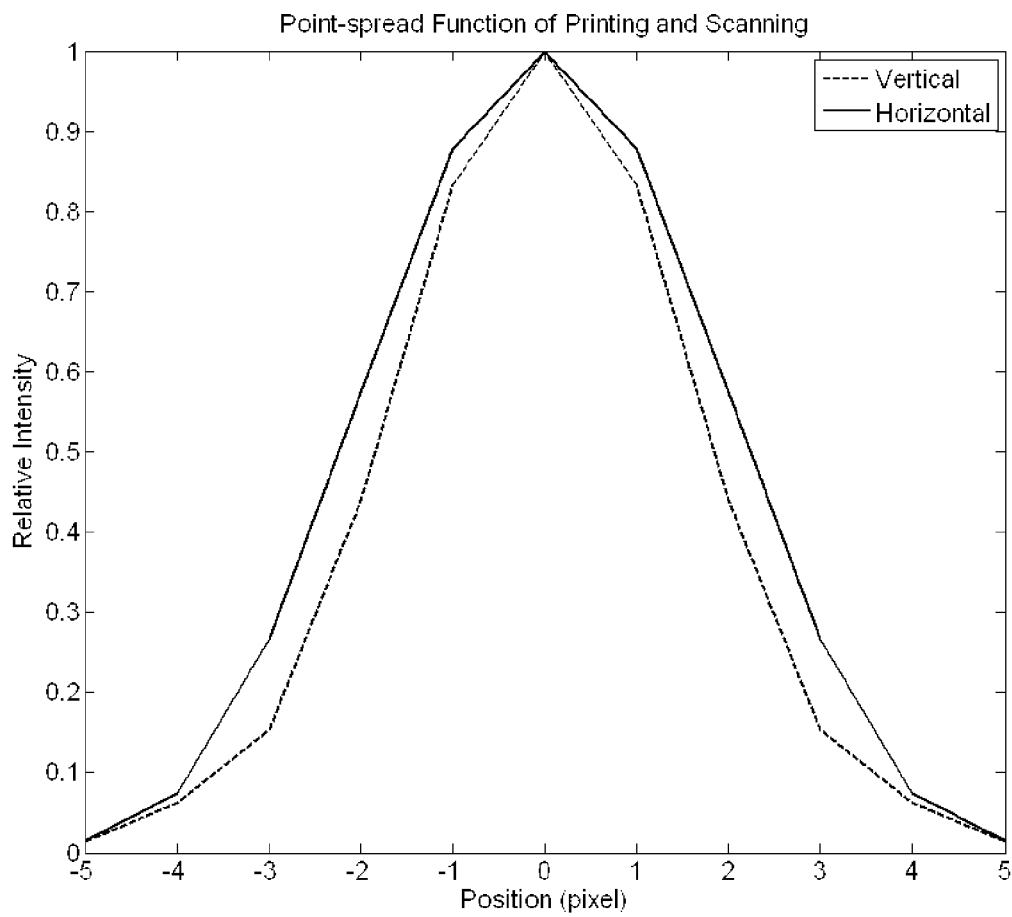
FIG. 6 illustrates an exemplary point-spread function.
Figure 7:
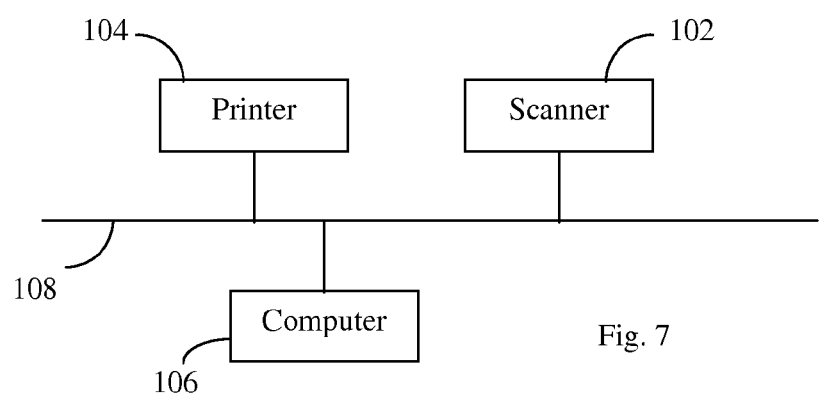
FIG. 7 schematically illustrates a data processing system in which embodiments of the present invention may be implemented.

Sharp edges in two orthogonal directions were printed and scanned, and the intensity profiles near the scanned edges were analyzed to obtain the ESFs (edge-spread functions). FIG. 5 shows examples of knife-edge responses. The ESF is slightly broader in the scanning (horizontal) direction than in the perpendicular (vertical) direction. The ESFs from the two perpendicular directions can be modeled with Cauchy or Gaussian functions. The inventors found that least square fitting with Gaussian functions gave smaller residual errors than Cauchy functions, while a previous study on scanning alone reported the opposite (see Smith). The combined two-dimensional PSF was obtained by multiplying the horizontal and vertical ESFs. FIG. 6 shows exemplary PSFs in two orthogonal directions. To quantify the degree of PSF asymmetry, the inventors calculated a PSF volume ratio defined in the equation below, $$r = \int_{-\infty}^{\infty} PSF_v \, dy / \int_{-\infty}^{\infty} PSF_h \, dx$$

where $PSF_v$ and $PSF_h$ are the central sections of the vertical and horizontal PSFs. For the example shown in FIG. 6, the PSF volume ratio is 0.876.

The inventors tested an implementation described above with multiple samples created from magazine and legal documents, including samples with halftone/watermark manipulation, handwriting alterations, illumination noise (simulated), coffee contamination, and graphics. In all cases, the supervised adaptive thresholding reduced the differences, as measured by Euclidean distance and classification error, between the original and binarized images by more than 46%. Incorporating deblurring further improved the reduction to more than 55%, compared to thresholding without supervision and deblurring (see Table 1 below).

Table 1 shows thresholding performance and the improvement with supervision and deblurring. Performance criteria are Euclidean distance and classification error, normalized by the total number of pixels. For each example, the first row is Euclidean distance, and the second row is classification error.

TABLE 1

| Example | Distances (N/S, N/D)* | Distances (S, N/D) | Distance reduction (S, N/D)$ | Distances (S, D) | Distance reduction (S, D)# |
|---|---|---|---|---|---|
| 1 (regular) | 0.0492 | 0.0164 | 66.75% | 0.0146 | 70.36% |
|  | 0.0761 | 0.0253 | 66.75% | 0.0225 | 70.36% |
| 2 (halftone) | 0.0476 | 0.0204 | 57.16% | 0.0168 | 64.70% |
|  | 0.0736 | 0.0315 | 57.16% | 0.0260 | 64.70% |
| 3 (alterations) | 0.0424 | 0.0225 | 46.97% | 0.0187 | 55.91% |
|  | 0.0655 | 0.0348 | 46.97% | 0.0289 | 55.91% |
| 4 (illumination noise) | 0.0444 | 0.0237 | 46.62% | 0.0197 | 55.76% |
|  | 0.0687 | 0.0367 | 46.62% | 0.0304 | 55.76% |
| 5 (contamination) | 0.0465 | 0.0174 | 62.62% | 0.0154 | 66.93% |
|  | 0.0718 | 0.0268 | 62.62% | 0.0237 | 66.93% |
| 6 | 0.0316 | 0.0164 | 48.20% | 0.0135 | 57.26% |

TABLE 1-continued

| Example | Distances (N/S, N/D)* | Distances (S, N/D) | Distance reduction (S, N/D)$ | Distances (S, D) | Distance reduction (S, D)# |
|---|---|---|---|---|---|
| (graphics) | 0.0573 | 0.0297 | 48.20% | 0.0245 | 57.26% |

*NS: no supervision;
S: with supervision;
ND: no deblurring;
D: with deblurring
$ Distance reduction (S, ND) = [Distance (NS, ND) − Distance (S, ND)]/Distance (NS, ND) × 100%
Distance reduction (S, D) = [Distance (NS, ND) − Distance (S, D)]/Distance (NS, ND) × 100%

As shown in Table 1, although the values of Euclidean distance and classification error per pixel are different, their reduction rates when supervision and deblurring are introduced are exactly the same. This is due to the fact that for binary images these two difference metrics are essentially describing the same characteristics between the foreground and background. Al an alternative to these two metrics, a weighted sum of multiple difference metrics, such as connectivity or character run-length measures, may be used as a metric and may further improve the optimization procedure in supervised adaptive thresholding.

Described above is a supervised adaptive thresholding method with deblurring to obtain a binary image from the print-and-scan process to best match the known original. The deblurring utilizes an asymmetric PSF derived from knife-edge responses of a print-and-scan system. The supervision is accomplished by using the original image as the benchmark in optimizing the threshold carried out on local sub-images. A starting threshold from Otsu's method is utilized to reduce the optimization time. Tests on multiple samples with various tampering manipulations between printing and scanning showed more than 55% reductions in differences between the original and binarized images of this method over the traditional non-supervised method.

One practical application of the above method for generating a binary image is document authentication. In one document authentication scheme, an original document image (digital image) is printed out and circulated, while the original document image is stored in a database. Alternatively, the original document image or contents extracted from the original document image may be encoded, such as in two-dimensional barcodes, and printed on the same sheet of recording medium as the document itself. Later, a hardcopy document that purports to be an authentic copy of the original print out is scanned, and the scanned document image is compared to the original document image (either from the database or decoded from the printed two-dimensional barcode) to determine if the hardcopy is authentic. The deblurring and binarizing methods described herein may be advantageously used in the scanning process to generate a binary scanned image that matches the original document image, thereby facilitating the image comparison and authentication.

The methods described above are implemented in a data processing system which includes a computer and a printer, scanner and/or multifunction machine connected to the computer. A multifunction machine is a machine that has a scanning section and a printing section, and perform print, scan and copy functions. An exemplary data processing system is shown in FIG. 3. The data processing system 100 includes a scanner 102, a printer 104, and a computer 106 are connected to each other by a network or other suitable communication system. The computer 106 comprises a processor and memory storing software programs. The processor executes the software programs in the memory to carry out the various processes. The computer generates the image data to be printed, and submit the data to the printer for printing. The actual printing can be is accomplished in any suitable manner. Similarly, scanning of the document may be accomplished in any suitable manner, and the computer connected to the scanner processes the scanned image data. Alternately, the software programs can respectively be stored in memories of the scanner 102 or the printer 104, and can respectively be executed by processors of the scanner or the printer.

Alternatively, in lieu of a scanner, a digital camera or other imaging devices may be used to generate the grayscale document image, on which the deblurring and binarizing method described above may be applied. In this regard, the term "scanned image" as used in this disclosure and the claims broadly refers to a digital image generated by scanning or photography or other suitable methods.

It will be apparent to those skilled in the art that various modification and variations can be made in the deblurring and binarizing method of the present invention without departing from the spirit or scope of the invention. Thus, it is intended that the present invention cover modifications and variations that come within the scope of the appended claims and their equivalents.

What is claimed is:

1. A method implemented in a data processing system for processing a hardcopy document, the hardcopy document having been printed by a printer based on a original image, the original image being a binary digital image, comprising:
   (a) generating a grayscale scanned image from the hardcopy document using an imaging device;
   (b) obtaining the original image;
   (c) dividing the original image into a plurality of original sub-images;
   (d) for each original sub-image,
      (d1) using template matching to find a scanned sub-image in the scanned image corresponding to the original sub-image;
      (d2) obtaining an initial threshold for binarizing the scanned sub-image; and
      (d3) obtaining an optimal threshold for binarizing the scanned sub-image using the initial threshold and an iterative search, and binarizing the scanned sub-image using the optimal threshold to generate an optimum binarized scanned sub-image that minimizes a measure of difference between the original sub-image and the binarized scanned sub-image; and
   (e) generating a binarized scanned image by combining the optimum binarized scanned sub-images generated in step (d).

2. The method of claim 1, further comprising, before step (d):
   (f) deblurring the scanned images by applying a deconvolution method to the scanned images using a point-spread function characteristic of the printer and the imaging device.

3. The method of claim 2, wherein the point-spread function is a two-dimensional point-spread function, wherein the method further comprises, before step (f),
   (g) calculating the two-dimensional point-spread function, comprising:
      (g1) generating a test binary image containing sharp edges in two non-parallel directions;
      (g2) printing the test image using the printer;
      (g3) generating a grayscale scanned test image from the printed test image using the imaging device;

(g4) calculating edge spread functions in two directions using pixel intensities of the scanned test image in vicinities of the sharp edges; and (g5) calculating the two-dimensional point-spread function from the edge spread functions.

4. The method of claim 1, further comprising, after step (e):

(f) applying morphological operations with asymmetric kernels to the binarized scanned image.

5. The method of claim 1, further comprising, before step (d):

(h) performing deskewing and registration of the scanned image to generate a deskewed and registered scanned image, wherein step (d) is performed on the deskewed and registered scanned image.

6. The method of claim 5, wherein step (h) comprises:

(h1) performing preliminary thresholding on the scanned image to generate a preliminary binary image;

(h2) extracting a representative pixel from each connected image component in the preliminary binary image to generate a simplified image;

(h3) calculating a skew angle of the simplified image;

(h4) calculating a deskewed scanned image from the scanned image using the skew angle; and (h5) performing template matching between the original image and the deskewed scanned image to generate the deskewed and registered scanned image.

7. The method of claim 1, wherein step (b) comprises obtaining the original image from a database.

8. A computer program product comprising a computer usable non-transitory medium having a computer readable program code embedded therein for controlling a data processing apparatus, the computer readable program code configured to cause the data processing apparatus to execute a process for processing a hardcopy document, the hardcopy document having been printed by a printer based on a digital original image, the original image being a binary image, the process comprising:

(a) generating a grayscale scanned image from the hardcopy document using an imaging device;

(b) obtaining the original image;

(c) dividing the original image into a plurality of original sub-images;

(d) for each original sub-image, (d1) using template matching to find a scanned sub-image in the scanned image corresponding to the original sub-image;

(d2) obtaining an initial threshold for binarizing the scanned sub-image; and (d3) obtaining an optimal threshold for binarizing the scanned sub-image using the initial threshold and an iterative search, and binarizing the scanned sub-image using the optimal threshold to generate an optimum binarized scanned sub-image that minimizes a measure of difference between the original sub-image and the binarized scanned sub-image; and (e) generating a binarized scanned image by combining the optimum binarized scanned sub-images generated in step (d).

9. The computer program product of claim 8, wherein the process further comprises, before step (d):

(f) deblurring the scanned images by applying a deconvolution method to the scanned images using a point-spread function characteristic of the printer and the imaging device.

10. The computer program product of claim 9, wherein the point-spread function is a two-dimensional point-spread function, wherein the process further comprises, before step (f), (g) calculating the two-dimensional point-spread function, comprising:

(g1) generating a test binary image containing sharp edges in two non-parallel directions;

(g2) printing the test image using the printer;

(g3) generating a grayscale scanned test image from the printed test image using the imaging device;

(g4) calculating edge spread functions in two directions using pixel intensities of the scanned test image in vicinities of the sharp edges; and (g5) calculating the two-dimensional point-spread function from the edge spread functions.

11. The computer program product of claim 8, wherein the process further comprises, after step (e):

(f) applying morphological operations with asymmetric kernels to the binarized scanned image.

12. The computer program product of claim 8, wherein the process further comprises, before step (d):

(h) performing deskewing and registration of the scanned image to generate a deskewed and registered scanned image, wherein step (d) is performed on the deskewed and registered scanned image.

13. The computer program product of claim 12, wherein step (h) comprises:

(h1) performing preliminary thresholding on the scanned image to generate a preliminary binary image;

(h2) extracting a representative pixel from each connected image component in the preliminary binary image to generate a simplified image;

(h3) calculating a skew angle of the simplified image;

(h4) calculating a deskewed scanned image from the scanned image using the skew angle; and (h5) performing template matching between the original image and the deskewed scanned image to generate the deskewed and registered scanned image.

14. The computer program product of claim 8, wherein step (b) comprises obtaining the original image from a database.

* * * * *